United States Patent

Osthues et al.

[11] Patent Number: 5,806,586
[45] Date of Patent: Sep. 15, 1998

[54] PLATE HEAT EXCHANGER WITH A REFRIGERANT DISTRIBUTOR

[75] Inventors: Josef Osthues, Schorndorf; Manfred Petz, Karlsruhe; Bernd Zeitvogel, Rastatt, all of Germany

[73] Assignee: Ernst Flitsch GmbH & Co., Fellbach, Germany

[21] Appl. No.: 583,085

[22] PCT Filed: Jun. 28, 1994

[86] PCT No.: PCT/EP94/02089

§ 371 Date: Dec. 29, 1995

§ 102(e) Date: Dec. 29, 1995

[87] PCT Pub. No.: WO95/02159

PCT Pub. Date: Jan. 19, 1995

[30] Foreign Application Priority Data

Jul. 3, 1993 [DE] Germany .......................... 43 22 197.1

[51] Int. Cl.⁶ ..................................................... F28F 9/02
[52] U.S. Cl. .......................... 165/174; 165/175; 165/907; 165/153
[58] Field of Search ................... 165/175, 174, 165/153, 907

[56] References Cited

U.S. PATENT DOCUMENTS

| 1,662,236 | 3/1928 | Coupland | 165/174 |
| 2,097,602 | 11/1937 | Rohlin | 165/174 |
| 2,555,055 | 5/1951 | Ort | 62/126 |
| 2,934,322 | 4/1960 | Hazard | 257/256 |
| 3,610,538 | 10/1971 | Enders | 165/174 X |
| 3,976,128 | 8/1976 | Patel et al. | 165/174 X |

FOREIGN PATENT DOCUMENTS

| 2479961 | 10/1981 | France | 165/174 |
| 633 361 | 7/1936 | Germany . | |
| 1 216 635 | 12/1966 | Germany . | |
| 1 931 148 | 1/1971 | Germany . | |
| 33 10 236 A1 | 9/1984 | Germany . | |
| 0355472 | 11/1972 | U.S.S.R. | 165/174 |
| 1126802 | 11/1984 | U.S.S.R. | 165/174 |
| 1278567 | 12/1986 | U.S.S.R. | 165/174 |
| 0025665 | 7/1912 | United Kingdom | 165/153 |
| 0962753 | 7/1964 | United Kingdom | 165/174 |

OTHER PUBLICATIONS

Patents Abstracts of Japan; M–1048, Nov. 14, 1990, vol. 14, No. 519, English language abstract for Japanese Patent No. 2–217764, dated Aug., 1990.

Patents Abstract of Japan; M–1213, Feb. 21, 1992, vol. 16, No. 72, English language abstract for Japanese Patent No. 3–260567, dated Nov., 1991.

Primary Examiner—Denise L. Ferensic
Assistant Examiner—Christopher Atkinson
Attorney, Agent, or Firm—Flynn, Thiel, Boutell & Tanis, P.C.

[57] ABSTRACT

A device is disclosed for distributing a two-phase refrigerating medium mass flow in a plate evaporator (12). The evaporator has a distribution channel (14) at the inlet side which may receive a refrigerating medium mass flow coming from an expansion valve (10) and several mutually spaced exchanger channels (16) which branch off from the distribution channel (14) in a substantially perpendicular direction. In order to ensure a uniform distribution of the refrigerant medium mass flow (28') among the exchanger channels (16), a porous body (38) is arranged in the distribution channel (14) between the refrigerating medium inlet (26) and the branch-off points of the exchanger channels (16). The porous body (38) is advantageously arranged in an outer throttle insert (32) which extends over at least part of the length of the distribution channel and in whose wall are located additional throttle openings (34) that lead to the exchanger channels (16).

17 Claims, 2 Drawing Sheets

PLATE HEAT EXCHANGER WITH A REFRIGERANT DISTRIBUTOR

FIELD OF THE INVENTION

BACKGROUND OF THE RELATED ART

In the case of the parallel duct system of a plate heat exchanger, it is difficult to achieve a uniform distribution of the refrigerant mass flow. The non-uniform distribution is attributable, above all, to a buildup of the liquid refrigerant components at the end of the distributor duct. This means that the exchanger sections located at the rear end are loaded with more liquid refrigerant than those on the inlet side. In this case, it may even happen that only gaseous refrigerant flows through the inlet-side sections, while the liquid component flows through the rear sections. This is accompanied by poor regulatability in the partial-load mode and a power loss under full load.

In a metering device for the refrigerant, it is known per se (U.S. Pat. No. 5,097,866) to arrange a porous body in the flow duct of the refrigerant. The porous body serves there as a filter and throttle element.

SUMMARY OF THE INVENTION

Proceeding from this, the object on which the invention is based is to develop a device which guarantees a largely uniform allocation of the oncoming two-phase refrigerant mass flow to the individual exchanger ducts.

To achieve this object, the feature combination specified in Patent Claim 1 is proposed. Advantageous embodiments and developments of the invention emerge from the dependent claims.

The solution according to the invention is based primarily on the notion that the liquid component of the oncoming refrigerant mass flow can be prevented from "shooting through" as far as the end of the distributor duct by the incorporation of suitable parallel-throughflow pores into the distributor duct and can be allocated more uniformly to the individual distributor sections by means of neutralizing flow within the distributor duct. In order to achieve this, it is proposed, according to the invention, that a porous body having a multiplicity of parallel-throughflow pores or passage orifices be arranged in the distributor duct between the refrigerant inlet and the branch points of the exchanger ducts, that the porous body be arranged in an outer throttle insert extending at least over part of the length of the distributor duct, and that throttle orifices leading to the exchanger ducts be arranged in the wall of the throttle insert.

According to a preferred embodiment of the invention, the porous body is designed as a hollow body with a cavity open on the inlet side and extending along the distributor duct and with an outer surface containing the pores or passage orifices, the hollow body being closed on its bottom located opposite the inlet side and likewise provided with passage orifices and being capable of extending partially or completely over the length of the distributor duct. In adaptation to the flow-off to the exchanger ducts, the hollow body expediently has an outer surface tapered conically from the inlet side towards the closed distributor end.

The throttle orifices of the outer throttle insert are expediently designed as radial bores in its wall. The preferably hollow-cylindrical outer throttle insert closed at the bottom is arranged releasably, together with the porous body, in the distributor duct and can therefore easily be exchanged for another or be subsequently inserted into an already existing evaporator. In order to guarantee a controlled distribution to the individual exchanger ducts, the throttle orifices of the throttle insert are preferably at a . . . the distance between the branch points of the exchanger ducts . . .

Figure 1:
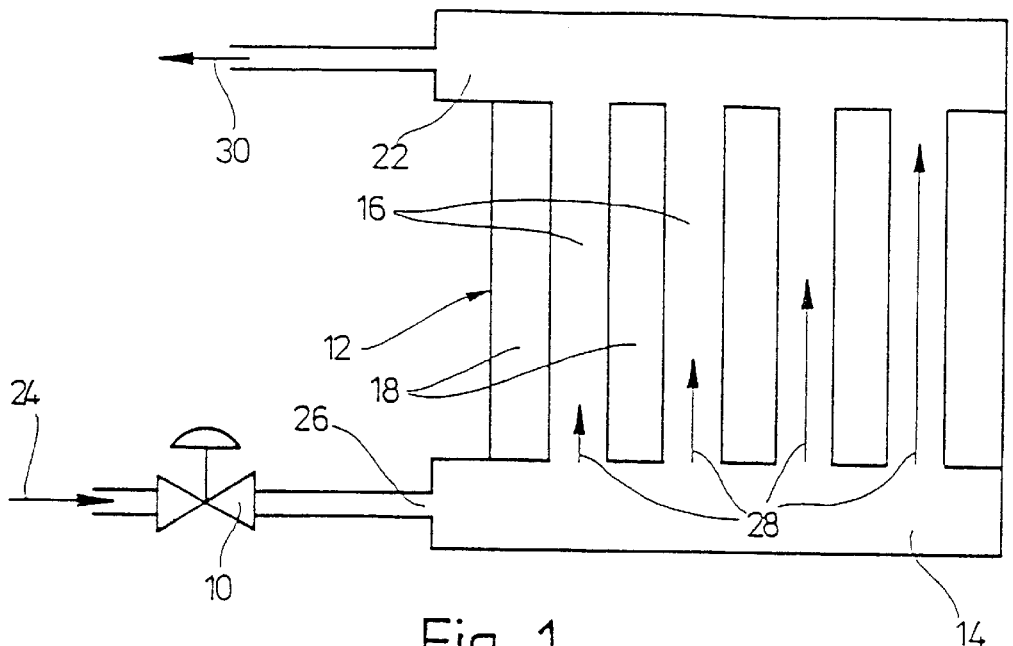
FIG. 1 shows a diagram of a conventional plate evaporator in a refrigerant circuit without a throttle insert.
Figure 2:
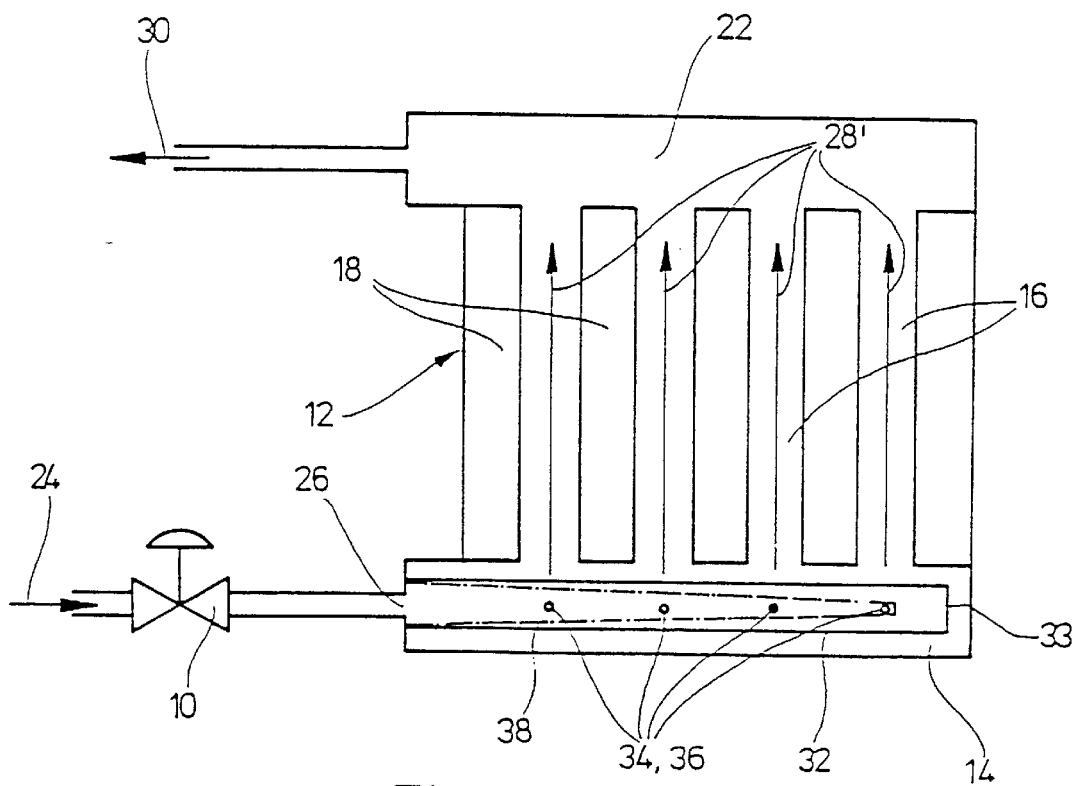
FIG. 2 shows a diagram corresponding to that of FIG. 1, with a throttle insert in the distributor duct of the plate evaporator.
Figure 3:
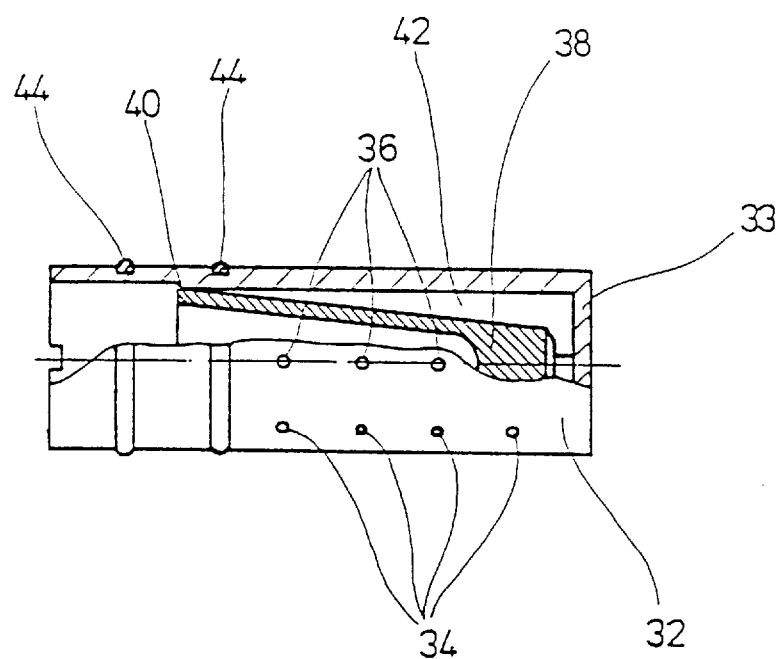
FIG. 3 shows a partial cross sectional side view of a throttle insert with a porous body for a plate evaporator.

FIGS. 1 and 2 show diagrammatically a detail of a refrigerant circuit with an expansion valve 10 and an evaporator 12. The evaporator 12 is designed as a plate heat exchanger having a relatively large number of exchanger ducts 16, 18 which are separated from one another by plates, are oriented substantially parallel to one another and through which refrigerant and a flow medium (for example, brine) of a secondary circuit alternately flow. The exchanger ducts 16, 18 communicate on the inlet side with a distributor duct 14 and on the outlet side with a collector duct 22. For the sake of clarity, only the distributor and collector ducts of the refrigerant circuit are shown in FIGS. 1 and 2.

In the refrigerant of a refrigeration system, liquid refrigerant under high pressure (arrow 24) is expanded in the expansion valve 10 to form a two-phase refrigerant mass flow and is guided by the inlet 26 into the distributor duct 14 of the evaporator 12. From there, the refrigerant mass flow is distributed to the various exchanger ducts 16, through which the flow passes in the direction of the arrows 28. The refrigerant mass flow is indicated by the length of the arrows 28. It can be seen from FIG. 1, in conventional evaporators, said refrigerant mass flow is distributed asymmetrically to the individual exchanger ducts 16. This is attributable to the fact that the liquid refrigerant components are built up at the end of the distributor duct 14 and from there pass preferably into the adjacent exchanger ducts 16, while the gaseous refrigerant components flow preferably through the exchanger ducts nearest the inlet. The liquid refrigerant components are evaporated on the exchanger surfaces, so that overheated refrigerant is returned into the circuit in the direction of the arrow 30 via the collector duct 22.

In the embodiment according to the invention shown in FIG. 2, there is arranged in the distributor duct 14 a hollow-cylindrical throttle insert 32 which extends over the entire length of the distributor duct 14. The preferably cylindrical throttle insert 32 is open on the side of the inlet 26 and closed on its bottom 33 and has a plurality of throttle orifices 34, 36 spaced from one another at a distance of the exchanger ducts 16 in the vicinity of the branch points of the latter. Located inside the throttle insert 32 additionally is a porous body 38 which is open on the inlet side and is closed at the bottom and which has the form of a hollow cone tapered in the direction of flow and consists, for example, of a porous sintered metal. At its inlet-side end 40, the porous body 38 bears closely on the inner surface of the throttle insert 32, while, in the region of the throttle orifices 34, it defines with its outer surface a flow space 42 located inside the throttle insert 32. The porous body 38 may advantageously be arranged releasably in the distributor duct 14.

The refrigerant mass flow coming from the expansion valve 10 first passes via the inlet 26 into the interior of the porous body 38. From there, the refrigerant passes through the pores of the porous body 38 into the flow space 42 within the throttle insert 32. During this time, the pores have the function of passage orifices which lead to a braking and deflection of the oncoming refrigerant flow, with only a slight pressure drop, and to a largely uniform distribution in the flow space 42. From there, the refrigerant is distributed uniformly via the throttle orifices 34, 36 to the individual exchanger ducts 16 (see the arrows 28' in FIG. 2). In this case, the liquid refrigerant component preferably overflows via the lower throttle orifices 34 into the exchanger ducts 16, while the gaseous refrigerant component overflows via the upper throttle orifices 36. This results in an essential separation of liquid and gaseous refrigerant which, by the choice of different cross sections on the lower and upper throttle orifices 34, 36, makes it possible to set different operating conditions of the refrigerant circuit. The annular seals 44 of the throttle insert 32 ensure that, on the inlet side, no undesirable direct overflow of refrigerant into the distributor duct 14 takes place.

The following is to be said in conclusion: The invention relates to a device for the distribution of a two-phase refrigerant mass flow in a plate evaporator 12. The evaporator has a distributor duct 14, which is capable of being loaded on the inlet side with the refrigerant mass flow coming from an expansion valve 10, and a plurality of exchanger sections 16 branched off essentially perpendicularly from the distributor duct 14 along the latter at a distance from one another. In order to guarantee a uniform distribution of the refrigerant mass flow 28' to the exchanger sections 16, it is proposed, according to the invention, that a porous body 38 be arranged in the distributor duct 14 between the refrigerant inlet 26 and the branch points of the exchanger sections 16. Advantageously, the porous body 38 is arranged in an outer throttle insert 32 which extends at least over part of the length of the distributor duct and in the wall of which additional throttle orifices 34 leading to the exchanger ducts 16 are located.

We claim:

1. A plate heat exchanger designed as an evaporator receiving a two-phase refrigerant from a distributor, the distributor being adapted to generally uniformly distribute the two-phase refrigerant throughout the evaporator, the distributor comprising an expansion valve supplying two-phase refrigerant, a refrigerant inlet receiving the two-phase refrigerant from the expansion valve, a distributor duct receiving the two-phase refrigerant from the refrigerant inlet, and a plurality of exchanger ducts branched off from the distributor duct at branch points arranged at a distance from one another along the distributor duct, the distributor duct including a porous body having a multiplicity of parallel-throughflow pores arranged between the refrigerant inlet and the branch points of the exchanger ducts, the pores generally uniformly supplying the two-phase refrigerant mass without separating the refrigerant mass into separate gas and liquid components along the length of the porous body, and a throttle insert extending at least part of the length of the distributor duct, the throttle insert housing the porous body therein, and a wall of the throttle insert having a plurality throttle orifices opening to the exchanger ducts supplying two-phase refrigerant to the exchanger ducts with generally equal amounts of the gas component being supplied to each exchanger duct and equal amounts of the liquid component being supplied to each exchanger duct.

2. The plate heat exchanger as claimed in claim 1, wherein the porous body is one of a sieve assembly, a perforated body and a porous sintered body.

3. The plate heat exchanger as claimed in claim 1, wherein the porous body is a hollow body having a cavity which is open on the inlet side and extends along the distributor duct and having an outer surface containing the pores.

4. The plate heat exchanger as claimed in claim 3, wherein the hollow body is closed on a bottom which is located opposite the inlet side and has pores therein.

5. The plate heat exchanger as claimed in claim 3, wherein the hollow body extends at least partially over the length of the distributor duct.

6. The plate heat exchanger as claimed in claim 1, wherein the porous body is arranged releasably in the distributor duct.

7. The plate heat exchanger as claimed in claim 3, wherein the hollow body forming the porous body has a closed end remote the inlet side and has an outer surface tapered conically from the inlet side toward the closed end of the hollow body.

8. The plate heat exchanger as claimed in claim 1, wherein the throttle insert has a hollow-cylindrical configuration and is closed at the bottom and is arranged releasably, together with the porous body, in the distributor duct.

9. The plate heat exchanger as claimed in claim 1, wherein the throttle orifices of the throttle insert are at a distance from one another corresponding to the distance between the branch points of the exchanger ducts.

10. The plate heat exchanger as claimed in claim 1, wherein a free flow space for the refrigerant is arranged between the porous body and the throttle insert.

11. The plate heat exchanger as claimed in claim 1, wherein the throttle insert has a hollow-cylindrical configuration and is oriented horizontally along the distributor duct, and wherein at least some of the throttle orifices are arranged in a lower region of the wall of the throttle insert.

12. The plate heat exchanger as claimed in claim 11, wherein the throttle insert has at least two groups of throttle orifices differing in their position in terms of height.

13. The plate heat exchanger as claimed in claim 1, wherein the throttle orifices the throttle insert are designed as radial bores in the wall of the throttle insert.

14. The plate heat exchanger as claimed in one of claim 1, wherein the throttle insert is closed at the bottom and is sealed off toward the inlet radially relative to the porous body and the distributor duct.

15. The plate heat exchanger as claimed in claim 12, wherein the throttle orifices of the throttle insert which belong to the first and second group have a differing passage cross sections.

16. A distributing apparatus providing generally uniform distribution of a two-phase mass to a plurality of exchanger ducts in a heat exchanger, the two-phase mass including a gas part and a liquid part, comprising:

a duct having a throttle and a porous body, said throttle having a wall, a throttle inlet, a closed throttle bottom end remote said inlet, and first and second groups of orifices in said wall, said wall enclosing a hollow interior between said inlet and closed bottom, said first group of orifices being positioned in said wall above said second group of orifices and differing in cross section relative to said second group of orifices, said porous body being positioned in said hollow interior of said throttle and having a plurality of pores, a porous body inlet receiving the two-phase mass, and a closed porous body bottom, said porous body tapering from said porous body inlet to said closed porous body bottom, a space being provided between said porous body and said throttle, said pores uniformly braking and deflecting both the liquid part and the gas part into said space, said first group of orifices uniformly distributing the gas part into the exchanger ducts, and said second group of orifices uniformly distributing the liquid part into the exchanger ducts.

17. A distributor for uniformly distributing a liquid/gas two-phase mass into a plurality of spaced apart exchanger ducts, comprising a porous body receiving the liquid/gas mass and having means for uniformly distributing the liquid/gas mass and preventing separation of a gas from said liquid/gas mass in said porous body, and a hollow throttle receiving said porous body therein and having means for uniformly distributing liquid and gas components of the liquid/gas mass in the plurality of exchanger ducts.

\* \* \* \* \*